United States Patent
Song (10) Patent No.: US 11,868,344 B1
(45) Date of Patent: Jan. 9, 2024

(54) SYSTEM, METHOD, AND COMPUTER PROGRAM FOR CROSS-LINGUAL TEXT-TO-SQL SEMANTIC PARSING WITH REPRESENTATION MIXUP

(71) Applicant: TENCENT AMERICA LLC, Palo Alto, CA (US)

(72) Inventor: Linfeng Song, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/941,571

(22) Filed: Sep. 9, 2022

(51) Int. Cl.
- *G06F 7/00* (2006.01)
- *G06F 16/2452* (2019.01)
- *G06F 40/30* (2020.01)
- *G06F 40/263* (2020.01)
- *G06F 16/242* (2019.01)

(52) U.S. Cl.
CPC ...... *G06F 16/24522* (2019.01); *G06F 16/242* (2019.01); *G06F 40/263* (2020.01); *G06F 40/30* (2020.01)

(58) Field of Classification Search
CPC ............. G06F 16/24522; G06F 16/242; G06F 40/263; G06F 40/30
USPC .................... 707/723, 736, 999.001, 999.003
See application file for complete search history.

(56) References Cited

U.S. PATENT DOCUMENTS

| | | |
|---|---|---|
| 2003/0171911 A1 | 9/2003 | Fairweather |
| 2007/0050191 A1 | 3/2007 | Weider et al. |
| 2014/0081633 A1 | 3/2014 | Badaskar |
| 2014/0365209 A1 | 12/2014 | Evermann |
| 2015/0302002 A1* | 10/2015 | Mathias ................. G06F 40/56 704/9 |
| 2018/0307679 A1* | 10/2018 | Duong .................... G06N 3/082 |
| 2021/0184995 A1* | 6/2021 | Jones ...................... G06F 40/58 |

OTHER PUBLICATIONS

International Search Report dated Jun. 26, 2023 in International Application No. PCT/US 23/16034.
Written Opinion dated Jun. 26, 2023 in International Application No. PCT/US 23/16034.

* cited by examiner

*Primary Examiner* — Md I Uddin
(74) *Attorney, Agent, or Firm* — Sughrue Mion, PLLC (57) ABSTRACT

A method, performed by at least one processor, and an apparatus for cross-lingual text-to-SQL semantic parsing is provided. The method and computer program code performed by the at least one processor include: generating a contextual representation of a source language utterances, a target language utterances, and a database schema; generating a mixed representation of the target language utterances and the database schema based on the contextual representation of the source language utterances, the target language utterances, and the database schema; concatenating the mixed representation of the target language utterances and the database schema; encoding the concatenated mixed representation of the target language utterances and the database schema, based on k-layer transformers; and generating SQL queries token-by-token based on the encoded concatenated mixed representation of the target language utterances and the database schema.

19 Claims, 6 Drawing Sheets

SYSTEM, METHOD, AND COMPUTER PROGRAM FOR CROSS-LINGUAL TEXT-TO-SQL SEMANTIC PARSING WITH REPRESENTATION MIXUP

FIELD

Apparatuses and methods consistent with example embodiments of the present disclosure generally relate to the field of semantic parsing. More specifically, the present disclosure relates to cross-lingual text-to-SQL semantic parsing and generating SQL queries for non-English utterances based on English database schemas.

BACKGROUND

Semantic parsing involves translating natural language utterances into meaning representations (e.g., lambda calculus and programming languages). Text-to-SQL semantic parsing, using SQL queries as the meaning representation, are increasingly used in both academia and other industries. Text-to-SQL semantic parsing benefit from recently annotated large-scale datasets. In related art, encoder-decoder pre-trained models using contextualized representations have been developed to improve semantic parsers. However, conventional semantic parsers primarily focus on English utterances. The performance of conventional cross-lingual text-to-SQL sematic parsers are not optimal. Machine-translation-based sematic parsing may be an effective method to tackling issues in conventional cross-lingual text-to-SQL sematic parsing (e.g., translating non-English utterances to English and using English parsers to generate SQL queries). However, translation systems introduce noise that result in unexpected predictions by the English parsers. As such, there is a need for systems that can proficiently handle non-English utterances as inputs to enhance user experience for non-English speakers and alleviate noise introduced by automatic translations.

SUMMARY

According to embodiments, methods are provided for augmenting multi-turn text-to-SQL datasets with self-play.

According to an aspect of the disclosure, a method for augmenting multi-turn text-to-SQL datasets is performed by at least one processor. The method includes generating an SQL-to-text model to converse with a text-to-SQL model; pre-training the SQL-to-text model and the text-to-SQL model based on input training data; sampling an SQL query as a goal query of an interaction between the SQL-to-text model and the text-to-SQL model; generating the interaction based on the goal query, a current utterance, previous utterances in the interaction, an SQL query from a preceding turn of the interaction, and a serialized database; and filtering the interaction based on a last turn of the interaction and the goal query, wherein the interaction is kept or filtered out based on a similarity score between the last turn of the interaction and the goal query.

The method may further include sampling the SQL query as the goal query includes building SQL templates using SQL queries in the input training data by replacing column and value mentions in the SQL queries with typed slots, and sampling an unseen database and fill the typed slots with columns and values from the sampled unseen database to form the goal query.

The method may further include concatenating the goal query with an empty context and a schema from the sterilized database to generate a first value, and inputting the first value into the SQL-to-text model to produce a first user utterance of the interaction.

The method may further include padding an utterance from the last turn of the interaction with a stop interaction symbol, wherein the interaction ends when the SQL-to-text model decodes the stop interaction symbol.

In some embodiments, when the similarity score is above a threshold value, the interaction may be determined to be grounded to the goal query and the interaction is kept, and when the similarity score is below the threshold value, the interaction may be determined not to be grounded to the goal query and the interaction is filtered out.

The method may further include re-training the SQL-to-text model and the text-to-SQL model based on the input training data and the filtered interaction.

The method may further include generating a next utterance in the interaction using the SQL-to-text model by concatenate the goal query, the SQL query from the preceding turn of the interaction, the previous utterances in the interaction, and a schema of the serialized database.

According to another aspect of the disclosure, an apparatus for augmenting multi-turn text-to-SQL datasets, including at least one memory configured to store computer program code and at least one processor configured to read the computer program code and operate as instructed by the computer program code, is provided. The computer program code including generating code configured to cause the at least one processor to generate an SQL-to-text model to converse with a text-to-SQL model; training code configured to cause the at least one processor to pre-train the SQL-to-text model and the text-to-SQL model based on input training data; first sampling code configured to cause the at least one processor to sample an SQL query as a goal query of an interaction between the SQL-to-text model and the text-to-SQL model; synthetic interaction generating code configured to cause the at least one processor to generate the interaction based on the goal query, a current utterance, previous utterances in the interaction, an SQL query from a preceding turn of the interaction, and a serialized database; and filtering code configured to cause the at least one processor to filter the interaction based on a last turn of the interaction and the goal query, wherein the interaction is kept or filtered out based on a similarity score between the last turn of the interaction and the goal query.

The apparatus may further include building code configured to cause the at least one processor to build SQL templates using SQL queries in the input training data by replacing column and value mentions in the SQL queries with typed slots; and second sampling code configured to cause the at least one processor to sample an unseen database and fill the typed slots with columns and values from the sampled unseen database to form the goal query.

The apparatus may further include concatenating code configured to cause the at least one processor to concatenate the goal query with an empty context and a schema from the sterilized database to generate a first value; and first user utterance code configured to cause the at least one processor to input the first value into the SQL-to-text model to produce a first user utterance of the interaction.

The apparatus may further include stopping code configured to cause the at least one processor to pad an utterance from the last turn of the interaction with a stop interaction symbol, wherein the interaction ends when the SQL-to-text model decodes the stop interaction symbol.

In some embodiments, when the similarity score is above a threshold value, the interaction may be determined to be grounded to the goal query and the interaction may be kept, and when the similarity score is below the threshold value, the interaction may be determined not to be grounded to the goal query and the interaction may be filtered out.

The apparatus may further include re-training code configured to cause the at least one processor to re-train the SQL-to-text model and the text-to-SQL model based on the input training data and the filtered interaction.

The apparatus may further include utterance generating code configured to cause the at least one processor to generate a next utterance in the interaction using the SQL-to-text model by concatenate the goal query, the SQL query from the preceding turn of the interaction, the previous utterances in the interaction, and a schema of the serialized database.

According to another aspect of the disclosure, a non-transitory computer-readable medium storing instructions that are executed by at least one processor, of an apparatus for augmenting multi-turn text-to-SQL datasets, is provided. The instructions cause the at least one processor to generate an SQL-to-text model to converse with a text-to-SQL model; pre-train the SQL-to-text model and the text-to-SQL model based on input training data; sample an SQL query as a goal query of an interaction between the SQL-to-text model and the text-to-SQL model; generate the interaction based on the goal query, a current utterance, previous utterances in the interaction, an SQL query from a preceding turn of the interaction, and a serialized database; and filter the interaction based on a last turn of the interaction and the goal query, wherein the interaction is kept or filtered out based on a similarity score between the last turn of the interaction and the goal query.

In some embodiments, the instructions may further cause the at least one processor to build SQL templates using SQL queries in the input training data by replacing column and value mentions in the SQL queries with typed slots, and sample an unseen database and fill the typed slots with columns and values from the sampled unseen database to form the goal query.

In some embodiments, the instructions may further cause the at least one processor to concatenate the goal query with an empty context and a schema from the sterilized database to generate a first value; input the first value into the SQL-to-text model to produce a first user utterance of the interaction; and pad an utterance from the last turn of the interaction with a stop interaction symbol, wherein the interaction ends when the SQL-to-text model decodes the stop interaction symbol.

When the similarity score is above a threshold value in some embodiments, the interaction may be determined to be grounded to the goal query and the interaction may be kept, and when the similarity score is below the threshold value, the interaction may be determined not to be grounded to the goal query and the interaction may be filtered out.

The non-transitory computer-readable medium may further include instructions that further cause the at least one processor to re-train the SQL-to-text model and the text-to-SQL model based on the input training data and the filtered interaction.

The non-transitory computer-readable medium may further include instructions that further cause the at least one processor to generate a next utterance in the interaction using the SQL-to-text model by concatenate the goal query, the SQL query from the preceding turn of the interaction, the previous utterances in the interaction, and a schema of the serialized database.

Additional embodiments will be set forth in the description that follows and, in part, will be apparent from the description, and/or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and an apparatus for cross-lingual text-to-SQL semantic parsing using a Representation Mixup Framework (Rex) that effectively alleviates noise from automatic translations. Although using English translation for parsing may seem like an effective way to bridge a language gap, the noise introduced by translation systems reduce the parsers effectiveness. According to the present disclosure, Rex effectively exploits translations in cross-lingual text-to-SQL tasks using a general encoding layer, a transition layer, and a target-centric encoding layer to properly guide information flow from the English translation.

Figure 1:
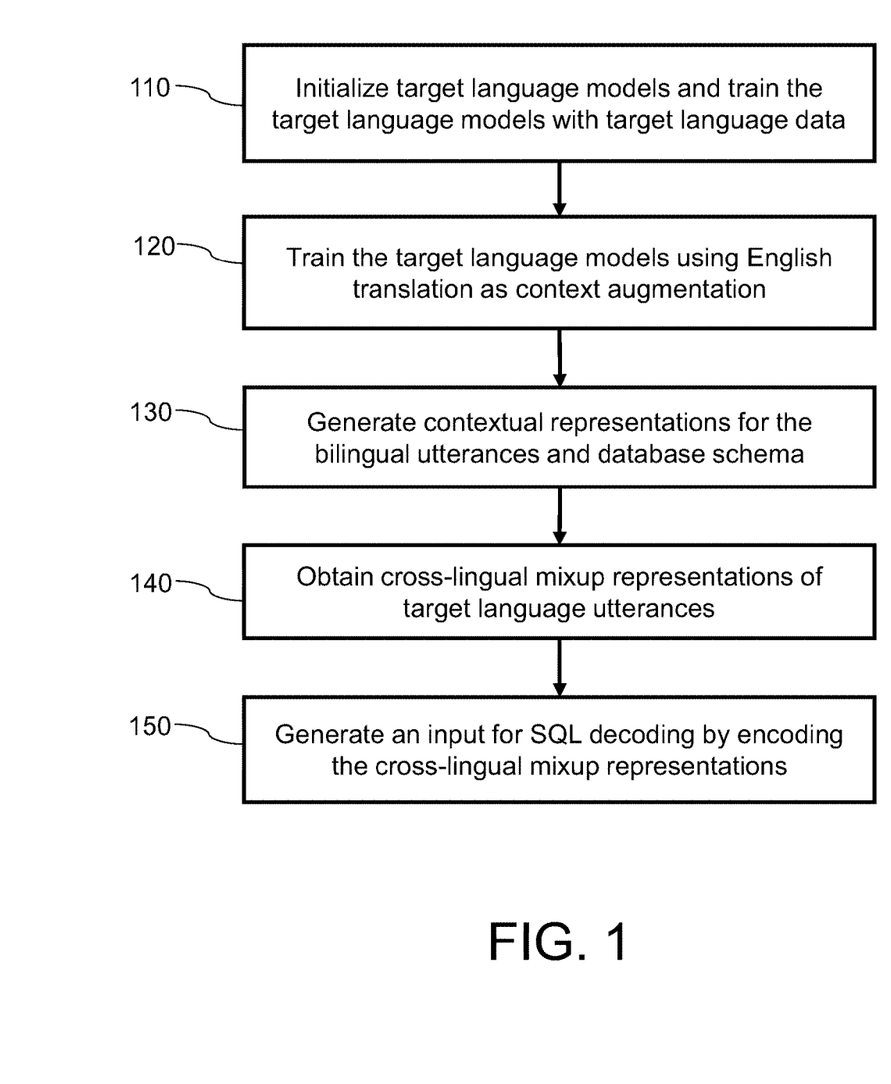
FIG. 1 a flowchart of an example a Representation Mixup Framework (Rex) process utilized by a system, device, or apparatus according to embodiments.

FIG. 1 a flowchart of an example Rex process utilized by a system, device, or apparatus according to embodiments.

First, Rex adopts a two-stage target language model training strategy. In the first stage, at S110, target language models (i.e., non-English language models) are initialized with a pre-trained English parser and the initialized target language models are trained with target language data. Using this first stage, the basic schema encoding ability and SQL decoding ability of the English parsers may be reused during target language model training. In the second stage, at S120, to further make use of English utterance encoding abilities of the parser, English translation is used as a context augmentation for bridging the cross-lingual gap and facilitating the target model training. At S130, the system may encode the English and non-English (i.e., target language) utterances and a database schema to generate contextual representations for the bilingual utterances and database schema. At S140, the system applies a transition layer to the contextual representations to obtain cross-lingual mixup representations of the target language utterances. The transition layer aims to make the best use of English translations with minimal noise being introduced to the system. Finally, at S150, the system encodes the cross-lingual mixup representation of the target language utterance to generate an input for SQL decoding. As such, the system is focused on the interaction between the target language utterance and the source language schema (i.e., database schema) and ignores the side effects caused by machine translation. Instead of concatenating the English translation and the target utterance directly, the Rex framework takes an encoder, a transition layer, and another encoder to properly guide the information flow of English translations, and in turn mitigate the issue of translation noises affecting the models effectiveness.

Figure 2:
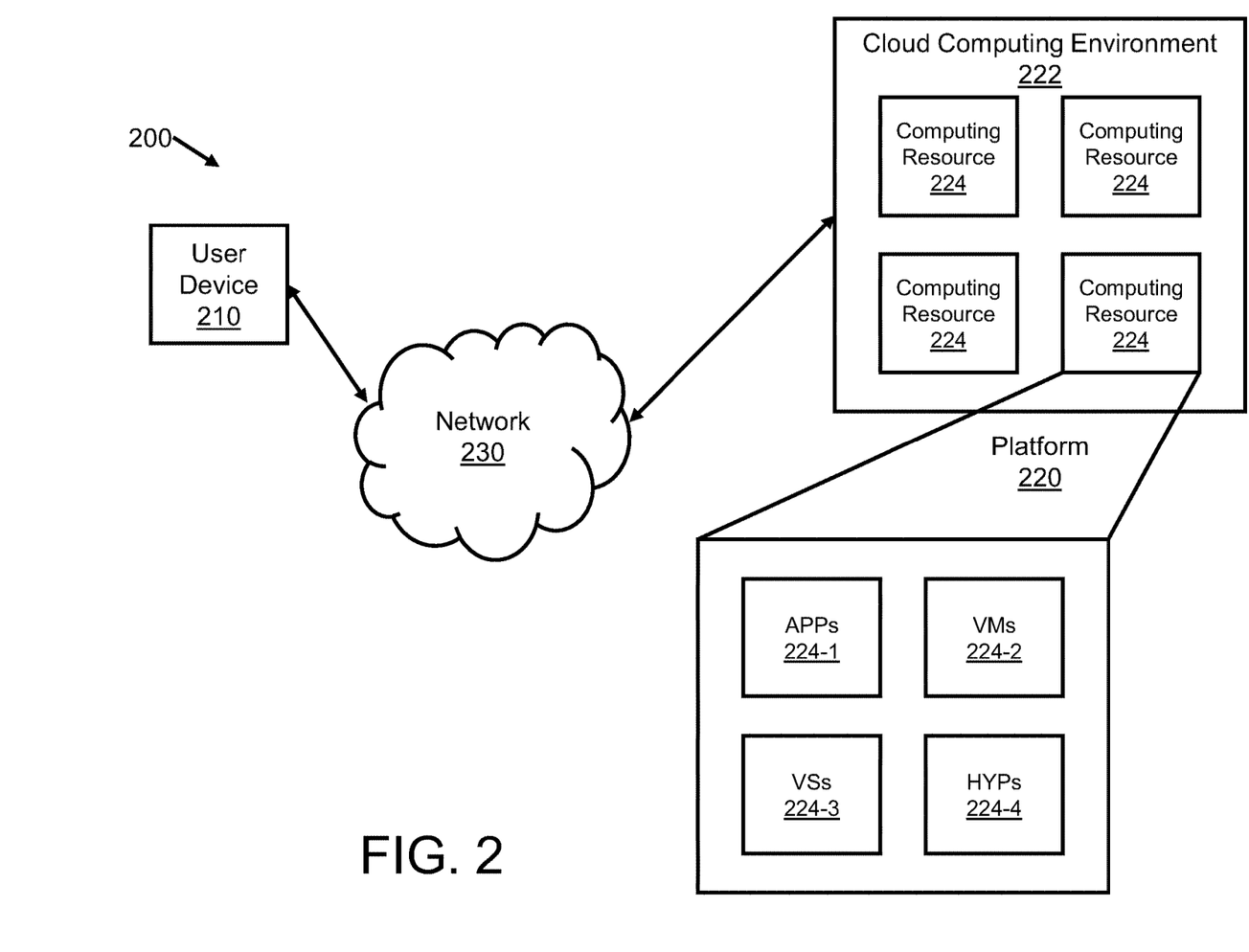
FIG. 2 is a diagram of an environment in which methods, apparatuses and systems described herein may be implemented according to embodiments.

FIG. 2 is a diagram of an environment 200 in which methods, apparatuses and systems described herein may be implemented, according to embodiments.

As shown in FIG. 2, the environment 200 may include a user device 210, a platform 220, and a network 230. Devices of the environment 200 may interconnect via wired connections, wireless connections, or a combination of wired and wireless connections.

The user device 210 includes one or more devices capable of receiving, generating, storing, processing, and/or providing information associated with platform 220. For example, the user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 210 may receive information from and/or transmit information to the platform 220.

The platform 220 includes one or more devices as described elsewhere herein. In some implementations, the platform 220 may include a cloud server or a group of cloud servers. In some implementations, the platform 220 may be designed to be modular such that software components may be swapped in or out. As such, the platform 220 may be easily and/or quickly reconfigured for different uses.

In some implementations, as shown, the platform 220 may be hosted in a cloud computing environment 222. Notably, while implementations described herein describe the platform 220 as being hosted in the cloud computing environment 222, in some implementations, the platform 220 may not be cloud-based (i.e., may be implemented outside of a cloud computing environment) or may be partially cloud-based.

The cloud computing environment 222 includes an environment that hosts the platform 220. The cloud computing environment 222 may provide computation, software, data access, storage, etc. services that do not require end-user (e.g., the user device 210) knowledge of a physical location and configuration of system(s) and/or device(s) that hosts the platform 220. As shown, the cloud computing environment 222 may include a group of computing resources 224 (referred to collectively as "computing resources 224" and individually as "computing resource 224").

The computing resource 224 includes one or more personal computers, workstation computers, server devices, or other types of computation and/or communication devices. In some implementations, the computing resource 224 may host the platform 220. The cloud resources may include compute instances executing in the computing resource 224, storage devices provided in the computing resource 224, data transfer devices provided by the computing resource 224, etc. In some implementations, the computing resource 224 may communicate with other computing resources 224 via wired connections, wireless connections, or a combination of wired and wireless connections.

As further shown in FIG. 2, the computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

The application 224-1 includes one or more software applications that may be provided to or accessed by the user device 210 and/or the platform 220. The application 224-1 may eliminate a need to install and execute the software applications on the user device 210. For example, the application 224-1 may include software associated with the platform 220 and/or any other software capable of being provided via the cloud computing environment 222. In some implementations, one application 224-1 may send/receive information to/from one or more other applications 224-1, via the virtual machine 224-2.

The virtual machine 224-2 includes a software implementation of a machine (e.g., a computer) that executes programs like a physical machine. The virtual machine 224-2 may be either a system virtual machine or a process virtual machine, depending upon use and degree of correspondence to any real machine by the virtual machine 224-2. A system virtual machine may provide a complete system platform that supports execution of a complete operating system ("OS"). A process virtual machine may execute a single program, and may support a single process. In some implementations, the virtual machine 224-2 may execute on behalf of a user (e.g., the user device 210), and may manage infrastructure of the cloud computing environment 222, such as data management, synchronization, or long-duration data transfers.

The virtualized storage 224-3 includes one or more storage systems and/or one or more devices that use virtualization techniques within the storage systems or devices of the computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 224-4 may provide hardware virtualization techniques that allow multiple operating systems (e.g., "guest operating systems") to execute concurrently on a host computer, such as the computing resource 224. The hypervisor 224-4 may present a virtual operating platform to the guest operating systems, and may manage the execution of the guest operating systems. Multiple instances of a variety of operating systems may share virtualized hardware resources.

The network 230 includes one or more wired and/or wireless networks. For example, the network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
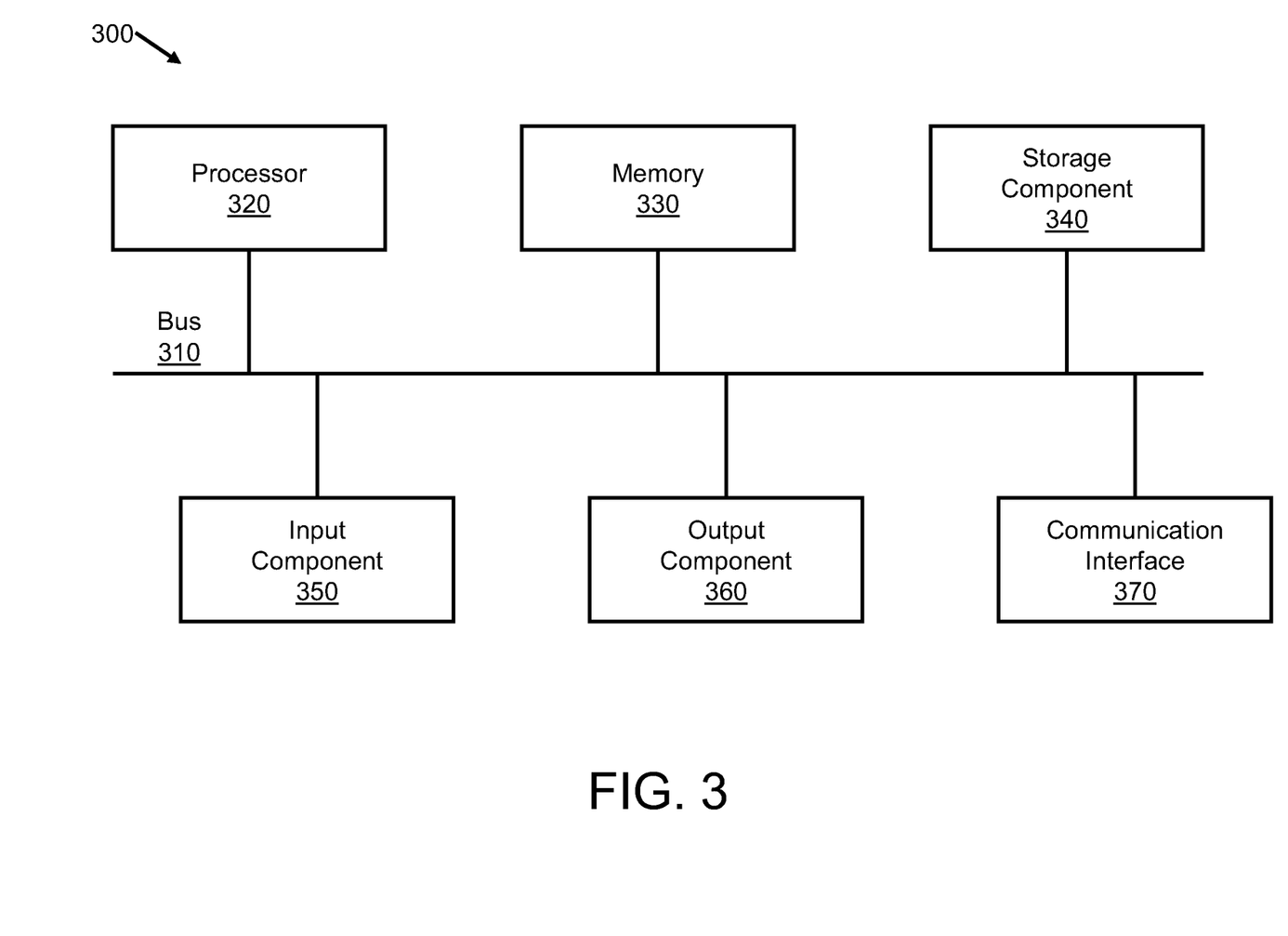
FIG. 3 is a block diagram of example components of one or more devices of FIG. 2.

FIG. 3 is a block diagram of example components of one or more devices of FIG. 2.

A device 300 may correspond to the user device 210 and/or the platform 220. As shown in FIG. 3, the device 300 may include a bus 310, a processor 320, a memory 330, a storage component 340, an input component 350, an output component 360, and a communication interface 370.

The bus 310 includes a component that permits communication among the components of the device 300. The processor 320 is implemented in hardware, software, or a combination of hardware and software. The processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 320 includes one or more processors capable of being programmed to perform a function. The memory 330 includes a random access memory (RAM), a read only memory (ROM), and/or another type of dynamic or static storage device (e.g., a flash memory, a magnetic memory, and/or an optical memory) that stores information and/or instructions for use by the processor 320.

The storage component 340 stores information and/or software related to the operation and use of the device 300. For example, the storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 350 includes a component that permits the device 300 to receive information, such as via user input (e.g., a touch screen display, a keyboard, a keypad, a mouse, a button, a switch, and/or a microphone). Additionally, or alternatively, the input component 350 may include a sensor for sensing information (e.g., a global positioning system (GPS) component, an accelerometer, a gyroscope, and/or an actuator). The output component 360 includes a component that provides output information from the device 300 (e.g., a display, a speaker, and/or one or more light-emitting diodes (LEDs)).

The communication interface 370 includes a transceiver-like component (e.g., a transceiver and/or a separate receiver and transmitter) that enables the device 300 to communicate with other devices, such as via a wired connection, a wireless connection, or a combination of wired and wireless connections. The communication interface 370 may permit the device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

The device 300 may perform one or more processes described herein. The device 300 may perform these processes in response to the processor 320 executing software instructions stored by a non-transitory computer-readable medium, such as the memory 330 and/or the storage component 340. A computer-readable medium is defined herein as a non-transitory memory device. A memory device includes memory space within a single physical storage device or memory space spread across multiple physical storage devices.

Software instructions may be read into the memory 330 and/or the storage component 340 from another computer-readable medium or from another device via the communication interface 370. When executed, software instructions stored in the memory 330 and/or the storage component 340 may cause the processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, the device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
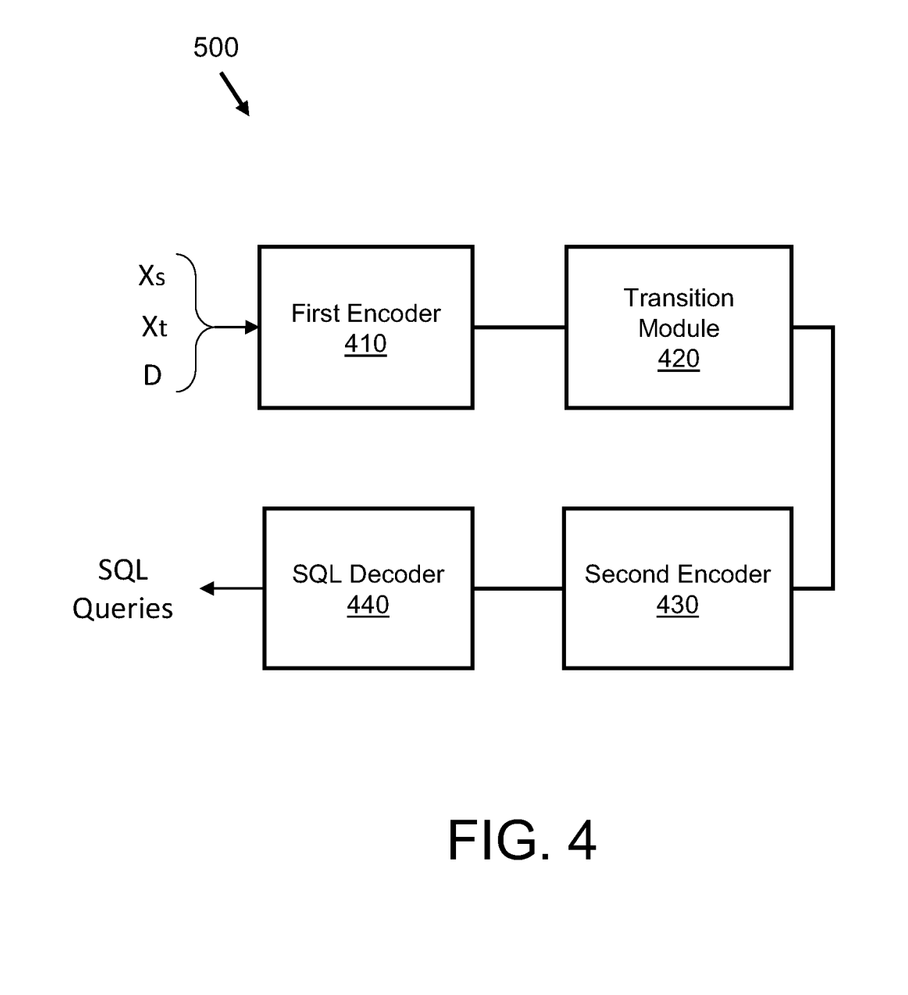
FIG. 4 is an example block diagram of a cross-lingual text-to-SQL parsing apparatus according to embodiments.
Figure 5:
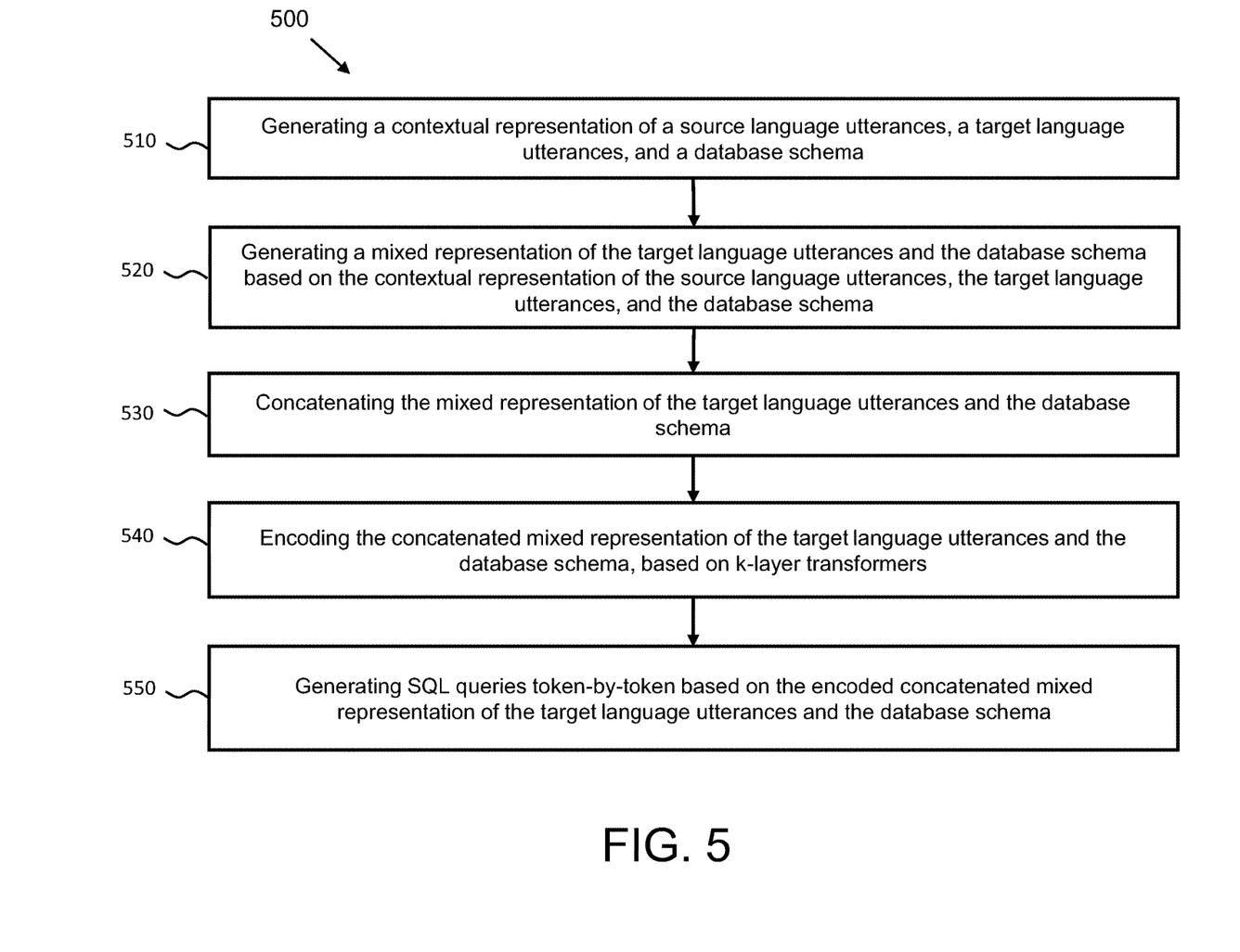
FIG. 5 is an exemplary flowchart illustrating a method for cross-lingual text-to-SQL semantic parsing using Rex according to embodiments.
Figure 6:
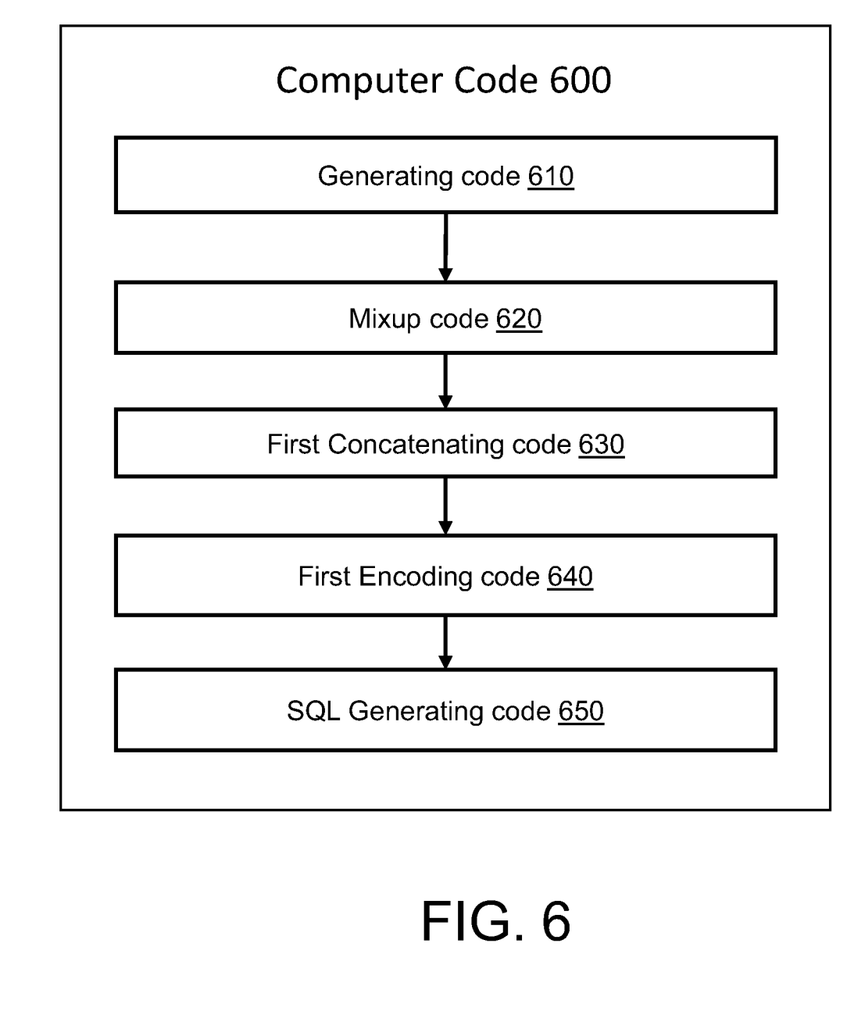
FIG. 6 is a block diagram of an example of computer code for cross-lingual text-to-SQL semantic parsing using Rex according to embodiments.

In embodiments, any one of the operations or processes of FIGS. 4-6 may be implemented by or using any one of the elements illustrated in FIGS. 2 and 3.

According to embodiments, given an utterance $X=(x_1, x_2, \ldots, x_n)$ and database schema T, a Natural language to SQL (NL2SQL) model is tasked with translating the utterance X into machine-executable language such as SQL. The model framework is based on an encoder-decoder architecture. The task is based on an internationalized database where the database schema is based on English. English is denoted as the source language. The natural language queries from users are in a non-English language, which is denoted as the target language.

An utterance in the target language is denoted as $X_t=\{x_1, x_2, \ldots, x_{n_t}\}$ with $n_t$ tokens. Similarly, an utterance in the source language with $n_s$ tokens is denoted as $X_s=\{x_1, x_2, \ldots, x_{n_s}\}$. The database schema D contains several tables $T \in D$ with column name $C=\{c_1, c_2, \ldots, c_{|T|}\}$, where $|T|$ denotes the number of columns in table T.

FIG. 4 is an example block diagram of a cross-lingual text-to-SQL parsing apparatus 400 according to embodiments. The apparatus 400 includes a first encoder 410, a transition module 420, a second encoder 430, and a SQL decoder 440.

The first encoder 410 may be a general encoder used to generate basic representations of the utterances. The first encoder 410 generates contextual representations of the source language utterance $X_s$, the target language utterance $X_t$, and the database schema D. The first encoder 410 is parameterized with m-layer transformers.

In some embodiments, the first encoder 410 may be an independent encoder. The independent encoder encodes the source language utterance $X_s$ and target language utterance $X_t$ with m-layer transformers to obtain a hidden representation of the source language utterance $H_s$ and a hidden representation of the target language utterance $H_t$. That is, the independent encoder may encode the utterances according to the following equations:

$$H_s^m = \text{Transformers}_s(X_s) \quad \text{(Equation 1)}$$

$$H_t^m = \text{Transformers}_t(X_t) \quad \text{(Equation 2)}$$

To encode the database schema D, the database schema D is first linearized into token sequence S. An m-layer transformer is applied on the linearized database schema token sequence S to obtain a hidden representation of the database schema $H_d$. That is, the independent encoder may encode the database schema according to the following equation:

$$H_d^m = \text{Transformers}_d(S) \quad \text{(Equation 3)}$$

By independently encoding the database schema from the utterances, the hidden representation of the database schema may be shared and reused for all queries of the database. Sharing and reusing the hidden representation of the database schema may also speed up model inferencing. The parameters of the m-layer transformers from different components (i.e., the source language utterance $X_s$ and the target language utterance $X_t$ transformers, and the database schema D transformers) may be independent or tied (i.e., shared across the components).

In some embodiments, the first encoder 410 may be a joint encoder. The interactions between the database schema and the utterances are vital for training an effective semantic parser. As such, instead of encoding that information independently, the joint encoder encodes the source language utterance $X_s$, target language utterance $X_t$, and the linearized database schema token sequence S together. The input of the joint encoder is the concatenation of the source language utterance $X_s$, the target language utterance $X_t$, and the linearized database schema token sequence S. The joint encoder may encode the input information according to the following equation:

$$H_s^m, H_t^m, H_d^m = \text{Transformers}([X_s;X_t;S]) \quad \text{(Equation 4)}$$

where [;] denotes the concatenation operation. Joint encoding allows for full information interaction between the utterances and the database schema. The apparatus 400 may be required to re-encode the database schema for each natural language query, where the model can benefit from the interaction of the utterances and the database schema.

The hidden representations are then input to the transition module 420. The transition module 420 includes the transition layer of the model. The transition layer is used to guide and enhance the information flow between different components (i.e., the source language utterance $X_s$, the target language utterance $X_t$, and the database schema D/the linearized database schema token sequence S) properly. The transition module 420 is an information mixer and information flow controller. The transition module 420 fuses the information from different components implicitly or explicitly. The fused information is then fed to the next layer of the model. The output of the transition module 420 is a mixup representation of the target language utterance $H_t^{m+1}$ and a mixup representation of the database schema $H_d^{m+1}$. The transition layer of the transition module 420 used to generate the mixup representations may be denoted by:

$$H_t^{m+1}, H_d^{m+1} = f(H_s^m, H_t^m, H_d^m) \quad \text{(Equation 5)}$$

That is, the transition layer ignores the source language utterance $X_s$ information. In this way, the source language utterance $X_s$ is only served as an information source for the target language utterance $X_t$, and/or the database schema D without explicitly interfering with the SQL decoder behavior due to unexpected translation noise.

In some embodiments, the transition module 420 uses an implicit full mixup transition mechanism. For the implicit full mixup, all three components are fused. The implicit full miuxp layer is parameterized by a single layer transformer and is denoted by:

$$H_t^{m+1}, H_d^{m+1} = \text{Transformer}([H_s^m;H_t^m;H_d^m])[p:q] \quad \text{(Equation 6)}$$

where [p: q] is the span of the concatenated sequence of the target language utterance $X_t$ and the linearized database schema token sequence S. The hidden state of the source language utterance is only served as keys and values, while the hidden states of the target language utterance and the database schema are served as queries besides the key and value in a multihead attention module of the transformers.

In some embodiments, the transition module 420 uses an implicit utterance mixup transition mechanism. The implicit utterance mixup layer implements the information flow transition on only the utterances. The implicit utterance mixup layer is denoted by:

$$H_d^{m+1}=\text{Transformer}([H_s^m;H_t^m])[p:q] \quad \text{(Equation 7)}$$

where the [p: q] is the span of the target language utterance $X_t$. For the database schema D representation, a skip connection is applied. The skip connection is denoted by:

$$H_d^{m+1}=H_d^m \quad \text{(Equation 8)}$$

Similar to the implicit full mixup, the hidden states of the utterances from source language are specifically used as keys and values, while the hidden states of the target utterances are used as queries in a multihead attention module of the transformers. The implicit utterance mixup enhances the representation of the target language utterance by integrating the information from source language counterpart. This can further reduce the cross-lingual representation discrepancy between the target language utterance and source language schema.

In some embodiments, the transition module 420 uses an explicit utterance mixup transition mechanism. Instead of using full connected self-attention to realize a mixup representation of the components, the explicit utterance mixup layer explicitly independently applies self-attention on the source language utterance and target language utterance. The explicit utterance mixup layer is denoted by:

$$H_s'=\text{MultiHead}\}(H_s^m,H_s^m,H_s^m) \quad \text{(Equation 9)}$$

$$H_t'=\text{MultiHead}\}(H_t^m,H_t^m,H_t^m) \quad \text{(Equation 10)}$$

Training the transition module 420 with a Manifold mixup provides a way to get intermediate representations, by conducting linear interpolation on the hidden states of the components, by leveraging a cross-attention layer. The Manifold mixup is denoted by:

$$H_t^{m+1}=\text{MultiHead}(H_t',h_s',h_s') \quad \text{(Equation 11)}$$

The cross-attention layer of the transformer shares the parameters with the self-attention layer. With the cross-attention layer, by using the hidden states of target language tokens as queries and hidden states of the source language tokens as keys and values, the model extracts target-relate signals from the source. With interpolation operation controlled by mixup ratio λ, the target representation may be enhanced using the following equation:

$$H_t^{m+1}=\text{LayerNorm}(\lambda H_{t|s}^{m+1}+(1-\lambda)H_t^{m+1}) \quad \text{(Equation 12)}$$

where the mixup ratio λ is shared by each example when training the model and during an inference stage of the model. A skip connection layer is applied to the database schema representations.

The output of the transition module 420 is then input to the second encoder 430. The second encoder 420 may be a target-centric encoder. The target-centric encoder only keeps the hidden states of the target language utterance and the database schema for further modeling. In turn, eliminating the side effects of noisy translations between the target language and the source language. The second encoder 430 is parameterized by k-layer transformers that are applied to the concatenation of the mixup representation of the target language utterance and the mixup representation of the database schema and may be denoted by:

$$H_t,H_d=\text{Transformers}([H_t^{m+1};H_d^{m+1}]) \quad \text{(Equation 13)}$$

The output of the second encoder 430 is then used in the SQL decoder 440 to generate SQL queries. The SQL decoder 440 is trained (using a transformer) to generate SQL queries token by token. The SQL queries are directly tokenized without any preprocessing. The cross-attention of the SQL decoder 440 is applied to the output of the second (i.e., target-centric) encoder 430. Compared to a grammar-based SQL decoder, the SQL generated by the SQL decoder 440 (token-by-token) may have syntactic errors. For example, the SQL decoder 440 may hallucinate column names that are not from the corresponding database schema. To alleviate this issue, the second encoder 430 may apply a constrained decoding algorithm (e.g., Parsing Incrementally for Constrained Auto-Regressive Decoding (Picard)) to improve the SQL generation quality.

FIG. 5 is an exemplary flowchart illustrating a method 500 for cross-lingual text-to-SQL semantic parsing using the Rex framework, according to embodiments.

In some implementations, one or more process blocks of FIG. 5 may be performed by the platform 220. In some implementations, one or more process blocks of FIG. 5 may be performed by another device or a group of devices separate from or including the platform 220, such as the user device 210.

As shown in FIG. 5, in operation 510 the method may include generating a contextual representation of a source language utterances, a target language utterances, and a database schema. In some embodiments, the contextual representations are generated using an independent encoding process including linearizing the database schema into a token sequence and encoding the source language utterances, the target language utterances, and the token sequence, based on m-layer transformers. In some embodiments, the contextual representations are generated using a joint encoding process including concatenating the source language utterances, the target language utterances, and the database schema, and encoding the concatenated source language utterances, target language utterances, and token sequence, based on m-layer transformer. The parameters of the m-layer transformers according to the joint encoding process may be independent or tied.

In operation 520, the method 500 may include generating a mixed representation of the target language utterances and the database schema based on the contextual representation of the source language utterances, the target language utterances, and the database schema. In some embodiments, the mixed representations may be generated using an implicit full mixup process including fusing the contextual representation of the source language utterances, the target language utterances, and the database schema in a mixup layer parameterized by a single layer transformer. In some embodiments, the mixed representations may be generated using an implicit utterance mixup process including fusing the contextual representation of the source language utterances and the target language utterances in a mixup layer parameterized by a single layer transformer to generate the mixed representation of the target utterances, and applying a skip connection to the database schema to generate the mixed representation of the database schema. In some embodiments, the mixed representations may be generated using an explicit utterance mixup process including applying self-attention to the source language utterances independently and the target language utterances independently in a first layer of a transformer to generate the mixed representation of the target language utterances, sharing parameters from a second layer of the transformer to the first layer of the transformer, enhancing the mixed representations of the target language utterances based on a mixup ratio of the second layer of the transformer, and applying a skip connection to the database schema to generate the mixed representation of the database schema.

In operation 530, the method 500 may include concatenating the mixed representation of the target language utterances and the database schema.

In operation 540, the method 500 may include encoding the concatenated mixed representation of the target language utterances and the database schema, based on k-layer transformers.

In operation 550, the method 500 may include generating SQL queries token-by-token based on the encoded concatenated mixed representation of the target language utterances and the database schema. In some embodiments, constrained decoding may be applied on the generated SQL.

Although FIG. 5 shows example blocks of the method, in some implementations, the method may include additional blocks, fewer blocks, different blocks, or differently arranged blocks than those depicted in FIG. 5. Additionally, or alternatively, two or more of the blocks of the method may be performed in parallel.

FIG. 6 is a block diagram of an example of computer code 600 for cross-lingual text-to-SQL semantic parsing using Rex, according to embodiments. According to embodiments of the present disclosure, an apparatus/device including at least one processor with memory storing computer program code may be provided. The computer program code may be configured to, when executed by the at least one processor, perform any number of aspects of the present disclosure.

As shown in FIG. 6, the computer program code 600 includes generating code 610, mixup code 620, first concatenating code 630, first encoding code 640, and SQL generating code 650.

The generating code 610 is configured to cause the at least one processor to generate a contextual representation of a source language utterances, a target language utterances, and a database schema.

The computer program code 600 may further include linearizing code configured to cause the at least one processor to linearize the database schema into a token sequence, and second encoding code configured to cause the at least one processor to encode the source language utterances, the target language utterances, and the token sequence, based on m-layer transformers, wherein the parameters of the m-layer transformers are independent or tied, to generate the contextual representations. The computer program code 600 may even further include second concatenating code configured to cause the at least one processor to concatenate the source language utterances, the target language utterances, and the database schema, and third encoding code configured to cause the at least one processor to encode the concatenated source language utterances, target language utterances, and token sequence, based on m-layer transformers, to generate the contextual representations.

The mixup code 620 is configured to cause the at least one processor to generate a mixed representation of the target language utterances and the database schema based on the contextual representation of the source language utterances, the target language utterances, and the database schema.

The computer program code 600 may further include fusing code configured to cause the at least one processor to fuse the contextual representation of the source language utterances and the target language utterances in a mixup layer parameterized by a single layer transformer to generate the mixed representation of the target utterances, and skip connection code configured to cause the at least one processor to apply a skip connection to the database schema to generate the mixed representation of the database schema to generate the mixed representations.

The computer program code 600 may even further include self-attention code configured to cause the at least one processor to apply self-attention to the source language utterances independently and the target language utterances independently in a first layer of a transformer to generate the mixed representation of the target language utterances, sharing code configured to cause the at least one processor to share parameters from a second layer of the transformer to the first layer of the transformer, and enhancing code configured to cause the at least one processor to enhance the mixed representations of the target language utterances based on a mixup ratio of the second layer of the transformer to generate the mixed representation of the target language utterances.

The first concatenating code 630 is configured to cause at least one processor to concatenate the mixed representation of the target language utterances and the database schema.

The first encoding code 840 is configured to cause at least one processor to encode the concatenated mixed representation of the target language utterances and the database schema, based on k-layer transformers.

The SQL generating code 650 is configured to cause at least one processor to generate SQL queries token-by-token based on the encoded concatenated mixed representation of the target language utterances and the database schema.

The computer program code 600 may even further include decoding code configured to cause the at least one processor to apply constrained decoding on the generated SQL.

Although FIG. 6 shows example blocks of the apparatus, in some implementations, the apparatus may include additional blocks, fewer blocks, different blocks, or differently arranged blocks than those depicted in FIG. 6. Additionally, or alternatively, two or more of the blocks of the apparatus may be combined. In other words, while FIG. 6 shows distinct blocks of code, the various code instructions need not be distinct and could be intermingled.

The methods and processes of cross-lingual text-to-SQL semantic parsing described according to embodiments of the disclosure (i.e., the Rex framework) achieve state-of-the-art performance and improve performance of conventional systems. Conventional systems are subject to noises from automatic translations and other issues. For example, when evaluated on text-to-SQL semantic parsing datasets (such as CSpider and VSpider, which are Chinese and Vietnamese cross-domain Text-to-SQL datasets adapted from Spider), the framework according to embodiments improves cross-lingual training and the effectiveness of the semantic parsers.

The model performance of the CSpider using the Rex framework according to embodiments is shown in Table 1. Exact Match (EM) accuracy is used as the evaluation metric. As shown in Table 1, the Rex framework obtains 66.1% EM accuracy on development set and 59.7% EM accuracy on hidden test set, exceeding the best performed system, i.e., LGESQL+ELECTRA+QT, by 1.6% on both development set and test set.

TABLE 1

Model Performance on the CSpider Development Set and Hidden Test Set

| Model | Dev. | Test |
| --- | --- | --- |
| DG-SQL (Wang et al. (2020)) | 50.4 | 46.9 |
| XL-SQL | 54.9 | 47.8 |
| RAT-SQL + GraPPa + Adv | 59.7 | 56.2 |
| LGESQL + ELECTRA + QT | 64.5 | 58.1 |
| Single-source | | |
| Target-language Training | 63.7 | — |
| Multi-source | | |
| Concatenation | 65.5 | — |
| REX | 66.1 | 59.7 |

The model performance of the VSpider using the Rex framework according to embodiments is shown in Table 2. Both EM accuracy and Test-suite (TS) accuracy are used as the evaluation metrics. The main results for VSpider are shown in Table 2. As a single source baseline, the target language training obtains 64.2% on EM accuracy and 59.0% on TS accuracy. The multi-source concatenation outperforms the target-language training, with 1.4% improvement on EM accuracy and 2.9% improvement on TS accuracy. The Rex framework achieves new state-of-the-art effectiveness on both EM accuracy and TS accuracy, with 69.0% EM accuracy and 64.5% TS accuracy. The results shown in Table 2 are results from a model based on a joint encoder, explicit utterance mixup with a 0.3 mixup ratio, and setting m=12 and k=11.

TABLE 2

Model Performance on the VSpider Development Set

| Model | EM | TS |
| --- | --- | --- |
| Single-source | | |
| Target-language Training | 64.2 | 59.0 |
| Multi-source | | |
| Concatenation | 65.6 | 61.9 |
| REX | 69.0 | 64.5 |

The techniques described above, can be implemented as computer software using computer-readable instructions and physically stored in one or more computer-readable media or by a specifically configured one or more hardware processors. For example, FIG. 2 shows an environment 200 suitable for implementing various embodiments. In one example, the one or more processors execute a program that is stored in a non-transitory computer-readable medium.

As used herein, the term component is intended to be broadly construed as hardware, software, or a combination of hardware and software.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for cross-lingual text-to-SQL semantic parsing, performed by at least one processor and comprising:
    initializing target language models and train the target language models with target language data;
    generating a contextual representation of a source language utterances, a target language utterances, and a database schema;
    generating a mixed representation of the target language utterances and the database schema based on the contextual representation of the source language utterances, the target language utterances, and the database schema;
    concatenating the mixed representation of the target language utterances and the database schema;
    encoding the concatenated mixed representation of the target language utterances and the database schema, based on k-layer transformers; and
    generating SQL queries token-by-token based on the encoded concatenated mixed representation of the target language utterances and the database schema;
    generating mixed representations of the target language utterances and the database schema comprises:
    applying self-attention to the source language utterances independently and the target language utterances independently in a first layer of a transformer to generate the mixed representation of the target language utterances;
    sharing parameters from a second layer of the transformer to the first layer of the transformer;
    enhancing the mixed representations of the target language utterances based on a mixup ratio of the second layer of the transformer;
    and applying a skip connection to the database schema to generate the mixed representation of the database schema.

2. The method of claim 1, wherein generating contextual representations comprises:
    linearizing the database schema into a token sequence; and
    encoding the source language utterances, the target language utterances, and the token sequence, based on m-layer transformers,
    wherein the parameters of the m-layer transformers are independent or tied.

3. The method of claim 1, wherein generating contextual representations comprises:
    concatenating the source language utterances, the target language utterances, and the database schema; and encoding the concatenated source language utterances, target language utterances, and token sequence, based on m-layer transformers.

4. The method of claim 1, further comprising applying constrained decoding on the generated SQL.

5. The method of claim 1, wherein generating mixed representations of the target language utterances and the database schema comprises fusing the contextual representation of the source language utterances, the target language utterances, and the database schema in a mixup layer parameterized by a single layer transformer.

6. The method of claim 1, wherein generating mixed representations of the target language utterances and the database schema comprises:
 fusing the contextual representation of the source language utterances and the target language utterances in a mixup layer parameterized by a single layer transformer to generate the mixed representation of the target utterances; and
 applying a skip connection to the database schema to generate the mixed representation of the database schema.

7. An apparatus for cross-lingual text-to-SQL semantic parsing, the apparatus comprising:
 at least one memory configured to store computer program code; and
 at least one processor configured to read the computer program code and operate as instructed by the computer program code, the computer program code including:
 initializing code configured to cause the at least one processor to target language models and train the target language models with target language data;
 generating code configured to cause the at least one processor to generate a contextual representation of a source language utterances, a target language utterances, and a database schema;
 mixup code configured to cause the at least one processor to generate a mixed representation of the target language utterances and the database schema based on the contextual representation of the source language utterances, the target language utterances, and the database schema;
 first concatenating code configured to cause the at least one processor to concatenate the mixed representation of the target language utterances and the database schema;
 first encoding code configured to cause the at least one processor to encode the concatenated mixed representation of the target language utterances and the database schema, based on k-layer transformers; and
 SQL generating code configured to cause the at least one processor to generate SQL queries token-by-token based on the encoded concatenated mixed representation of the target language utterances and the database schema;
 representation generating code configured to cause the at least one processor to generate mixed representations of the target language utterances and the database schema comprises:
 applying self-attention to the source language utterances independently and the target language utterances independently in a first layer of a transformer to generate the mixed representation of the target language utterances;
 sharing parameters from a second layer of the transformer to the first layer of the transformer;
 enhancing the mixed representations of the target language utterances based on a mixup ratio of the second layer of the transformer;
 and applying a skip connection to the database schema to generate the mixed representation of the database schema.

8. The apparatus of claim 7, the computer program code further including:
 linearizing code configured to cause the at least one processor to linearize the database schema into a token sequence; and
 second encoding code configured to cause the at least one processor to encode the source language utterances, the target language utterances, and the token sequence, based on m-layer transformers, wherein the parameters of the m-layer transformers are independent or tied.

9. The apparatus of claim 7, the computer program code further including:
 second concatenating code configured to cause the at least one processor to concatenate the source language utterances, the target language utterances, and the database schema; and
 third encoding code configured to cause the at least one processor to encode the concatenated source language utterances, target language utterances, and token sequence, based on m-layer transformers.

10. The apparatus of claim 7, the computer program code further including decoding code configured to cause the at least one processor to apply constrained decoding on the generated SQL.

11. The apparatus of claim 7, the computer program code further including fusing code configured to cause the at least one processor to fuse the contextual representation of the source language utterances, the target language utterances, and the database schema in a mixup layer parameterized by a single layer transformer.

12. The apparatus of claim 7, the computer program code further including:
 fusing code configured to cause the at least one processor to fuse the contextual representation of the source language utterances and the target language utterances in a mixup layer parameterized by a single layer transformer to generate the mixed representation of the target utterances; and
 skip connection code configured to cause the at least one processor to apply a skip connection to the database schema to generate the mixed representation of the database schema.

13. The apparatus of claim 7, the computer program code further including:
 self-attention code configured to cause the at least one processor to apply self-attention to the source language utterances independently and the target language utterances independently in a first layer of a transformer to generate the mixed representation of the target language utterances;
 sharing code configured to cause the at least one processor to share parameters from a second layer of the transformer to the first layer of the transformer;
 enhancing code configured to cause the at least one processor to enhance the mixed representations of the target language utterances based on a mixup ratio of the second layer of the transformer; and
 skip connection code configured to cause the at least one processor to apply a skip connection to the database schema to generate the mixed representation of the database schema.

14. A non-transitory computer-readable medium storing instructions that, when executed by at least one processor of an apparatus for cross-lingual text-to-SQL semantic parsing, cause the at least one processor to:

initialize target language models and train the target language models with target language data;
 generate a contextual representation of a source language utterances, a target language utterances, and a database schema;
 generate a mixed representation of the target language utterances and the database schema based on the contextual representation of the source language utterances, the target language utterances, and the database schema;
 concatenate the mixed representation of the target language utterances and the database schema;
 encode the concatenated mixed representation of the target language utterances and the database schema, based on k-layer transformers; and
 generate SQL queries token-by-token based on the encoded concatenated mixed representation of the target language utterances and the database schema;
 generating mixed representations of the target language utterances and the database schema comprises:
 applying self-attention to the source language utterances independently and the target language utterances independently in a first layer of a transformer to generate the mixed representation of the target language utterances;
 sharing parameters from a second layer of the transformer to the first layer of the transformer;
 enhancing the mixed representations of the target language utterances based on a mixup ratio of the second layer of the transformer;
 and applying a skip connection to the database schema to generate the mixed representation of the database schema.

15. The non-transitory computer-readable medium of claim 14, wherein the instructions further cause the at least one processor to:

generate the contextual representation of the source language utterances, the target language utterances, and the database schema by one of:
 (i) linearize the database schema into a token sequence; and
 encode the source language utterances, the target language utterances, and the token sequence, based on m-layer transformers, wherein the parameters of the m-layer transformers are independent or tied, and
 (ii) concatenate the source language utterances, the target language utterances, and the database schema; and
 encode the concatenated source language utterances, target language utterances, and token sequence, based on m-layer transformers.

16. The non-transitory computer-readable medium of claim 14, wherein the instructions further cause the at least one processor to apply constrained decoding on the generated SQL.

17. The non-transitory computer-readable medium of claim 14, wherein the instructions further cause the at least one processor to fuse the contextual representation of the source language utterances, the target language utterances, and the database schema in a mixup layer parameterized by a single layer transformer.

18. The non-transitory computer-readable medium of claim 14, wherein the instructions further cause the at least one processor to:

fuse the contextual representation of the source language utterances and the target language utterances in a mixup layer parameterized by a single layer transformer to generate the mixed representation of the target utterances; and
 apply a skip connection to the database schema to generate the mixed representation of the database schema.

19. The non-transitory computer-readable medium of claim 14, wherein the instructions further cause the at least one processor to:

apply self-attention to the source language utterances independently and the target language utterances independently in a first layer of a transformer to generate the mixed representation of the target language utterances;
 share parameters from a second layer of the transformer to the first layer of the transformer;
 enhance the mixed representations of the target language utterances based on a mixup ratio of the second layer of the transformer; and
 apply a skip connection to the database schema to generate the mixed representation of the database schema.

* * * * *